May 13, 1958
H. B. ABER
2,834,171
TRACTOR MOUNTED CORN HARVESTER
Filed Oct. 8, 1953
9 Sheets-Sheet 1
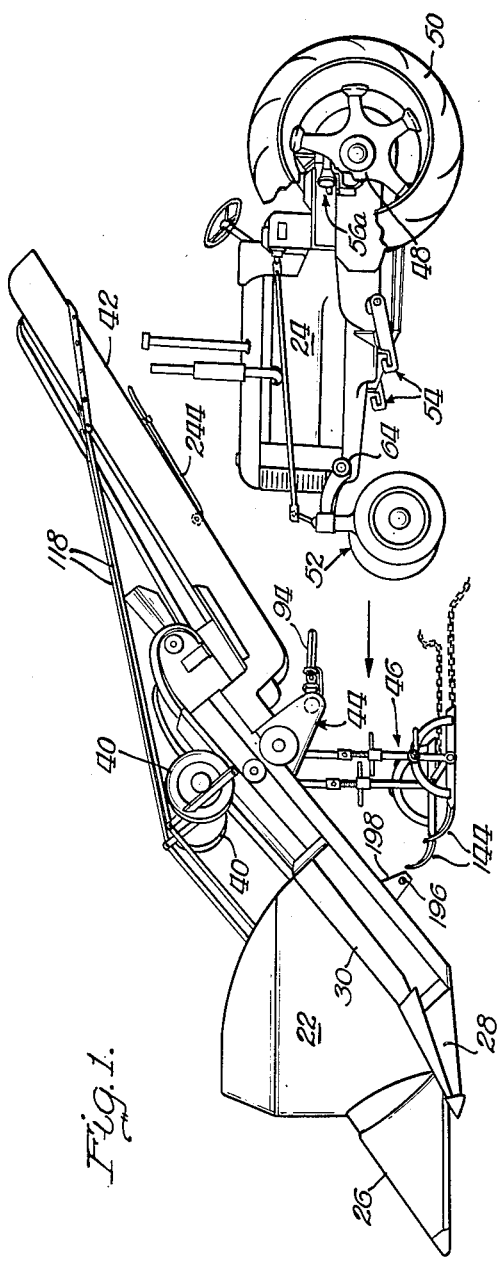
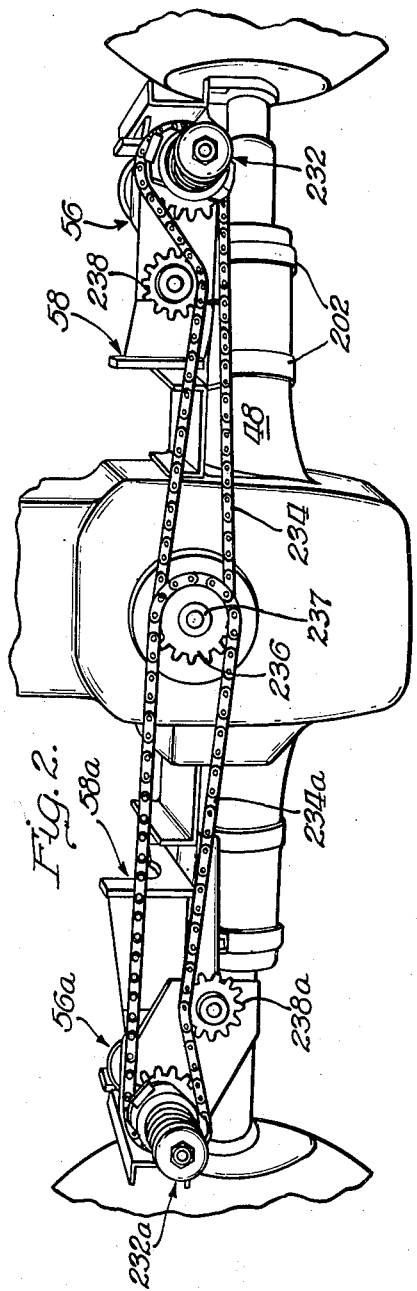
INVENTOR.
Homer B. Aber
BY
Soans, Blaister & Anderson
Attys.

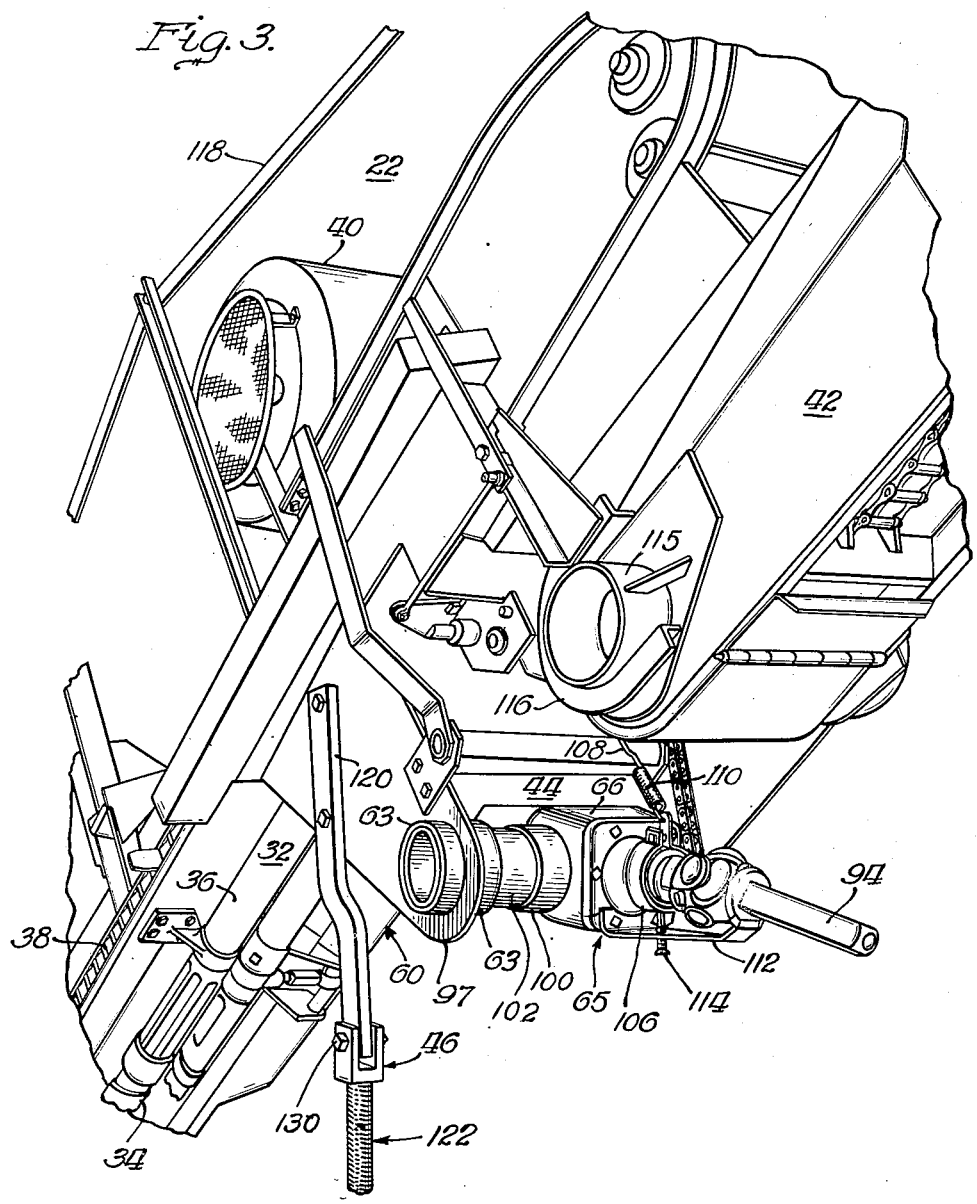

May 13, 1958  H. B. ABER  2,834,171
TRACTOR MOUNTED CORN HARVESTER
Filed Oct. 8, 1953  9 Sheets-Sheet 3

INVENTOR.
Homer B. Aber
BY
Soans, Blaister & Anderson
Attys.

May 13, 1958 H. B. ABER 2,834,171
TRACTOR MOUNTED CORN HARVESTER
Filed Oct. 8, 1953 9 Sheets-Sheet 4

INVENTOR.
Homer B. Aber
BY
Soans, Glaister & Anderson
Attys.

May 13, 1958 H. B. ABER 2,834,171
TRACTOR MOUNTED CORN HARVESTER
Filed Oct. 8, 1953 9 Sheets-Sheet 5

INVENTOR.
Homer B. Aber
BY
Soans, Glaister & Anderson
Attys.

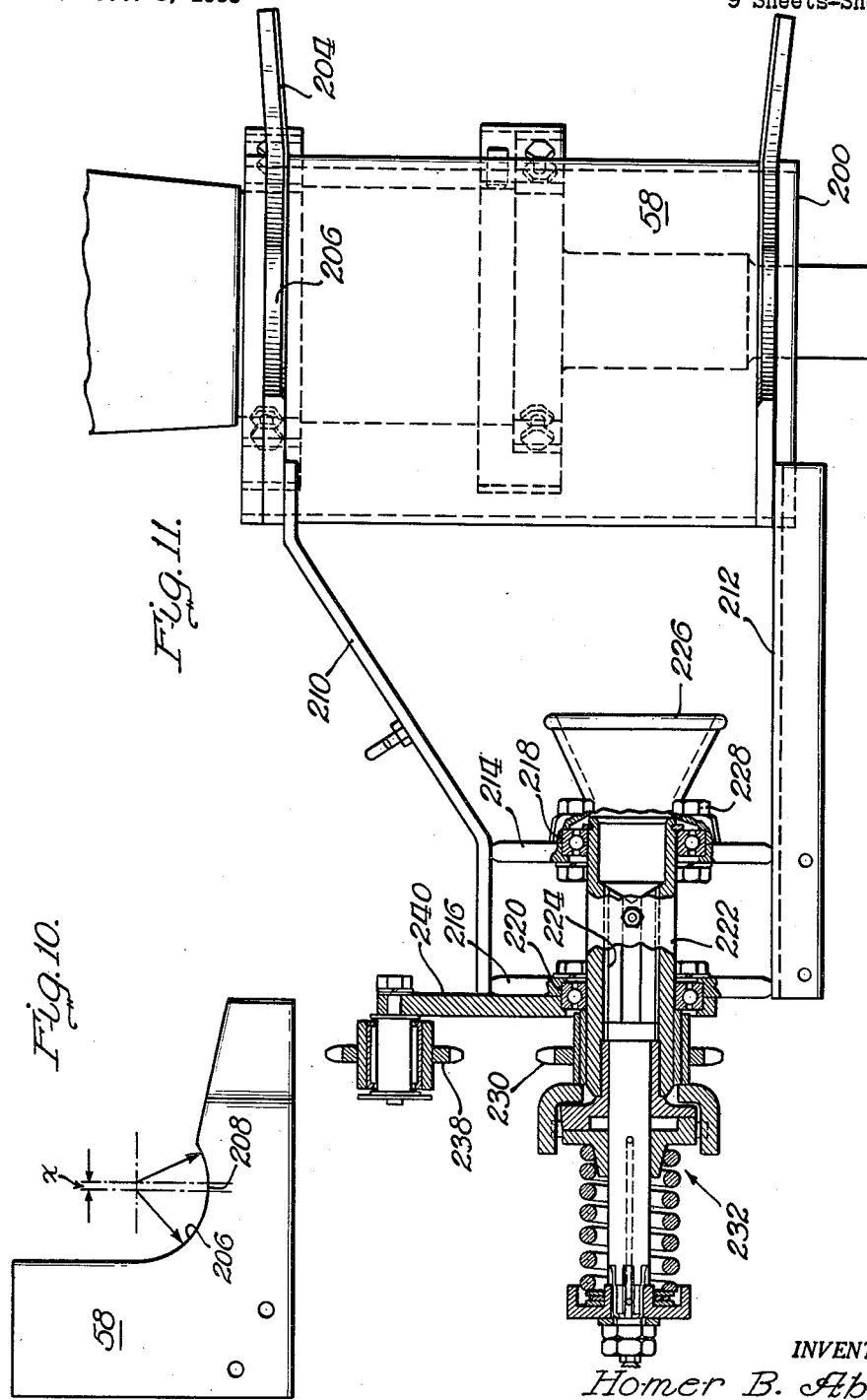

May 13, 1958   H. B. ABER   2,834,171
TRACTOR MOUNTED CORN HARVESTER
Filed Oct. 8, 1953   9 Sheets-Sheet 7
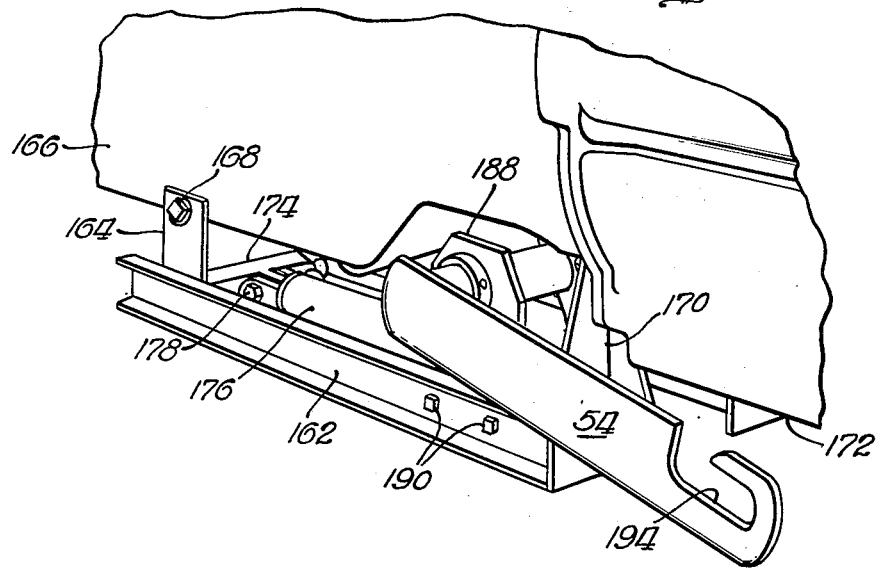
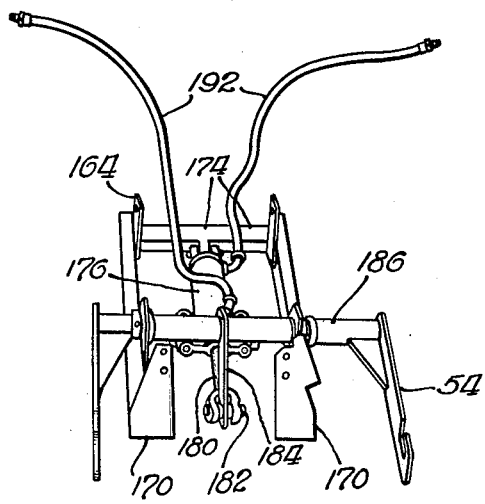
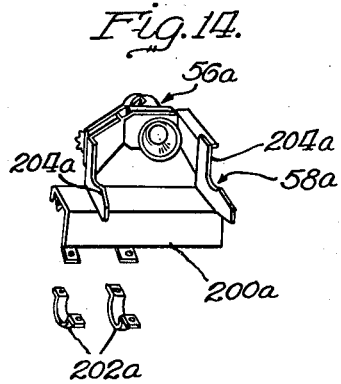
INVENTOR.
Homer B. Aber
BY
Soans, Blaister & Anderson
Attys.

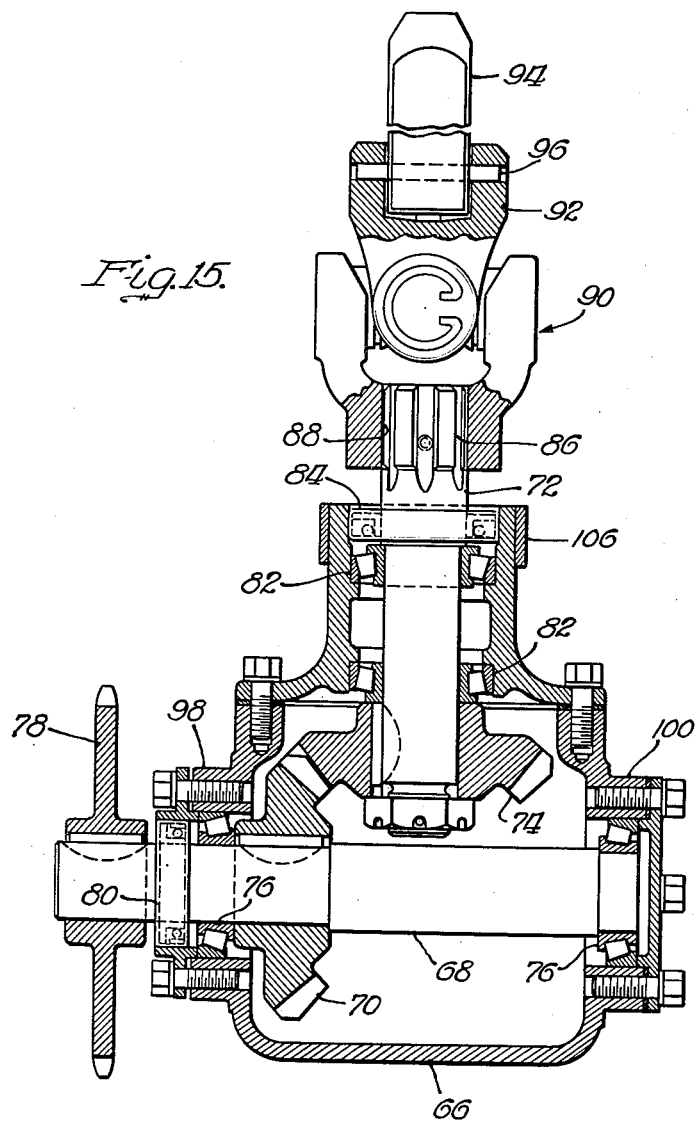

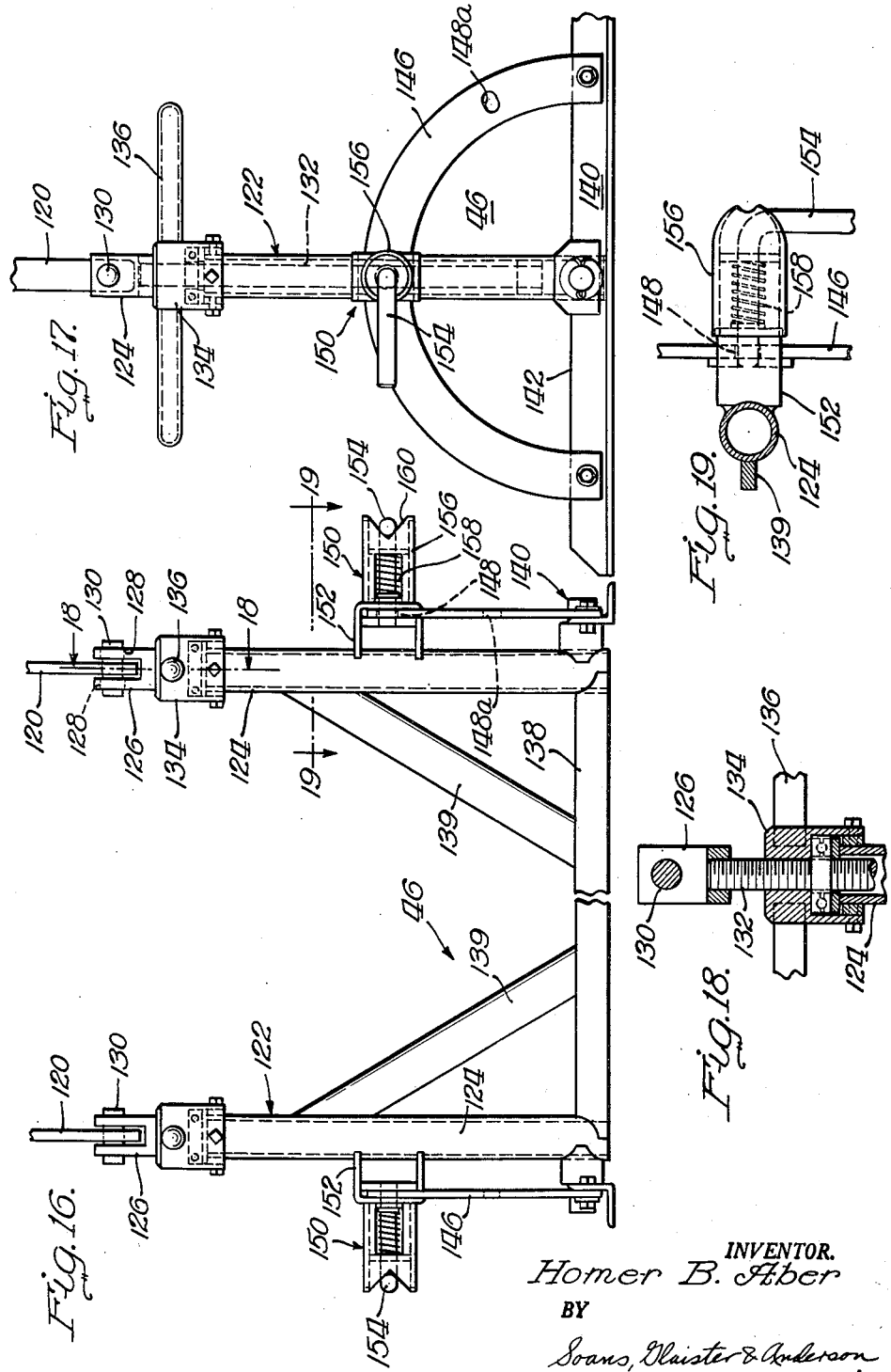

United States Patent Office 2,834,171
Patented May 13, 1958

2,834,171

TRACTOR MOUNTED CORN HARVESTER

Homer B. Aber, Bettendorf, Iowa, assignor to J. I. Case Company, Racine, Wis., a corporation of Wisconsin Application October 8, 1953, Serial No. 384,829

7 Claims. (Cl. 56—18)

The present invention relates generally to corn harvesters and is particularly directed to corn harvesters which are supported on a tractor with the harvester mechanism driven from a source of power on the tractor.

The advantages afforded by the use of tractor mounted corn harvesters are often obscured by the amount of labor and time involved in mounting and dismounting the harvester and the resulting loss of the tractor for performing other services. As a result, the most practical manner of operation has been to mount the corn harvester on the tractor and leave it there for the duration of the harvesting season. In this way the farmer is prepared to harvest his corn at the most opportune time, but he must provide other propelling means for performing the other farming operations which must also be carried on during the corn harvesting season.

The principal object of the present invention is to provide a novel and improved form of corn harvester and mounting means therefor which afford ready attachment of the harvester on the tractor by driving the tractor to a position within the frame of the harvester. Another object is to provide a corn harvester with an improved form of attaching means and drive coupling and including means for adjustably supporting said attaching means and drive coupling in elevated relation to the ground so that a tractor may be driven into a position with respect thereto affording automatic coupling of the tractor with the attaching means and with the drive coupling on the harvester. A further object of the present invention is to provide an improved tractor and power driven implement combination, wherein the power driven implement is rotatably balanced on the tractor about an axis closely overlying the rear axle structure to afford a maximum of traction for the tractor and requiring a minimum of lift effort on the forward end of the implement to vertically adjust the relative position thereof, and to afford a close coupling of the drive from the tractor to the power driven implement.

Other objects and advantages will be apparent as the disclosure progresses with respect to the accompanying nine sheets of drawings, wherein:

Fig. 1 is a side view showing a tractor and corn harvester, with the latter in a self-supporting position ready to receive the tractor, wherein parts are broken away to show certain details.

Fig. 2 is an enlarged, fragmentary rear view of the tractor, including some of the drive mechanism for the harvester.

Fig. 3 is an enlarged perspective view of a portion of the corn harvester.

Fig. 10 is an enlarged, side elevation of the pivot mounting carried by the tractor for receiving the corn harvester.

Fig. 11 is an enlarged plan view, partly in section, of the pivot mounting and the associated harvester drive mechanism on the right side of the tractor.

Fig. 12 is an enlarged perspective view of the tractor supported lift mechanism.

Fig. 13 is an enlarged perspective plan view of the lift mechanism seen in Fig. 12.

Fig. 14 is an enlarged perspective view of the pivot mounting on the left side of the tractor.

Fig. 15 is an enlarged plan view, in section, of the drive connection carried by the corn harvester.

Fig. 16 is an enlarged rear view of the supporting jacks for the harvester, with parts broken away.

Fig. 17 is a side elevation of the supporting jack, with parts broken away.

Fig. 18 is an enlarged sectional view, taken along line 18—18 in Fig. 16.

Fig. 19 is an enlarged plan view, partly in section, taken along the line 19—19 in Fig. 16.

Figure 4:
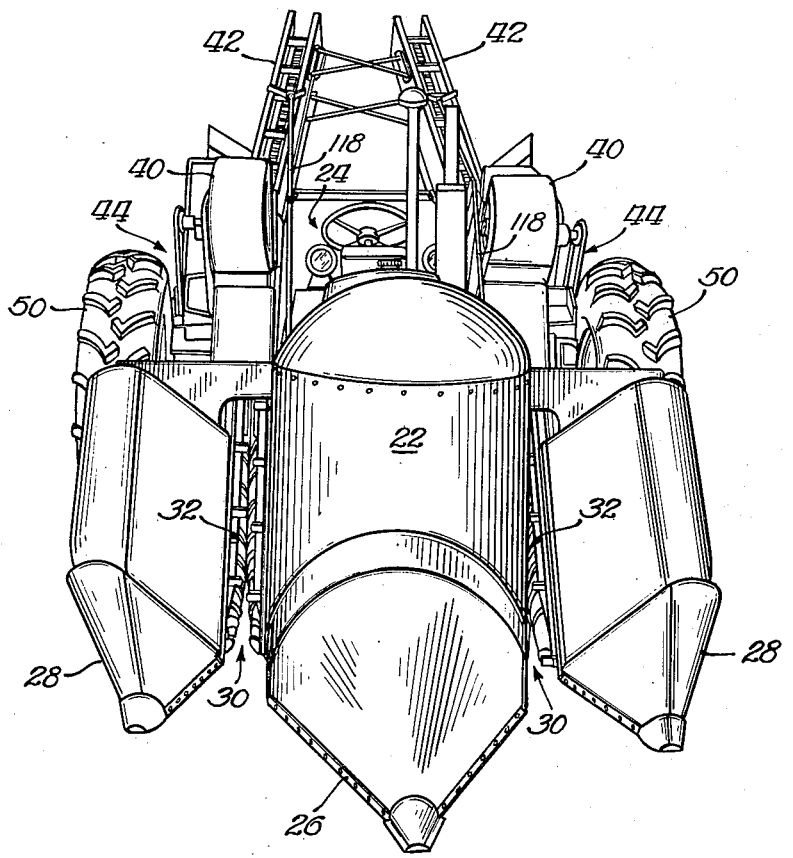
Fig. 4 is a front view of the tractor mounted corn harvester.

Referring particularly to Fig. 1 of the drawings, it is seen that the illustrated embodiment of the present invention comprises generally an agricultural implement in the form of a corn harvester 22 which is adapted to be mounted on a tractor 24 for movement therewith. The corn harvester 22 is of the two-row variety and includes a forward section including a frame structure defining a center divider point 26, a pair of outer divider or gathering points 28, and a pair of stalkways 30. A pair of harvesting rolls 32 are rotatably mounted on the harvester in underlying relation to each of the stalkways to comprise therewith a gathering unit. These rolls include a picking section 34 and a husking section 36 (Fig. 3) which cooperate to strip the ears of corn from the stalks, as the latter are directed through the stalkway by a pair of gathering chains 38, and to remove the husks from the ears.

Figure 5:
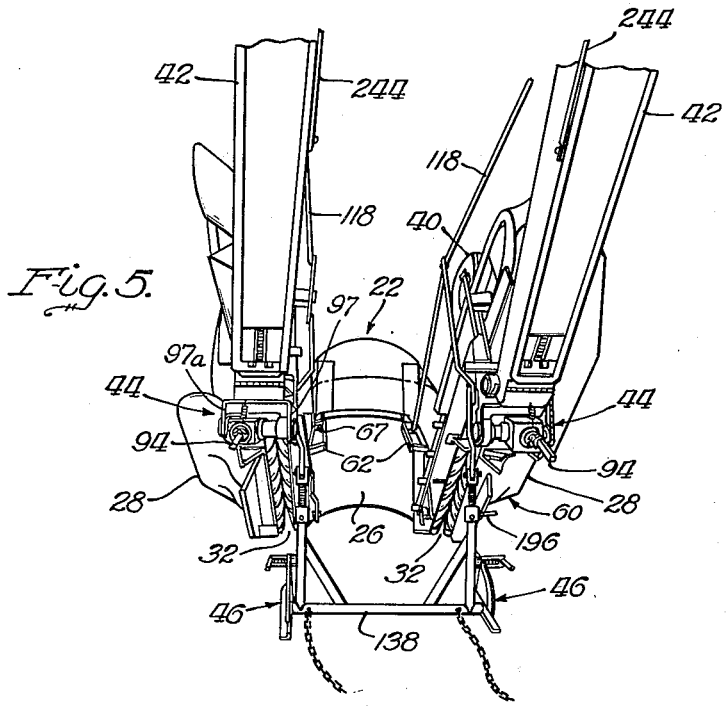
Fig. 5 is a rear view of the corn harvester.

At the upper end of the stalkways 30 there are positioned a pair of blower fans 40 for separating the trash from the husked ears of corn, and a pair of elevators 42 for carrying the ears rearwardly to a trailing vehicle (not shown). The corn harvester 22 also includes a suitable drive mechanism, indicated generally at 44, and a pair of supporting jacks 46 for maintaining the harvester in properly elevated position to receive the supporting tractor 24. It will be noted from Fig. 4 and Fig. 5 that the stalkways 30 and the underlying harvesting rolls 32 diverge rearwardly of the front end of the tractor 24, and that the elevators 42 converge at the rear of the tractor. This feature of construction affords easy entrance of the front end of the tractor within the harvester frame, and yet provides for delivery of the husked ears of corn within a confined area at the rear to insure proper delivery to a trailing wagon or the like.

The tractor 24 is preferably of the tri-cycle type having a wide rear axle structure 48 mounting a pair of drive wheels 50, a narrow dirigible front wheel structure 52, a pair of lift arms 54, a pair of drive means 56 and 56a (Fig. 2) mounted on the rear axle structure 48 in position for engagement with the drive mechanism 44 of the harvester, and an implement support comprising a pair of pivot mountings 58 and 58a disposed on the tractor rear axle in position for supporting engagement with the corn harvester. It is seen, therefore, that the illustrated apparatus comprises generally a tractor and harvester combination affording a drive-in type of coupling of the tractor with the corn harvester which quickly places the two machines in position for operation as a unit.

Figure 6:
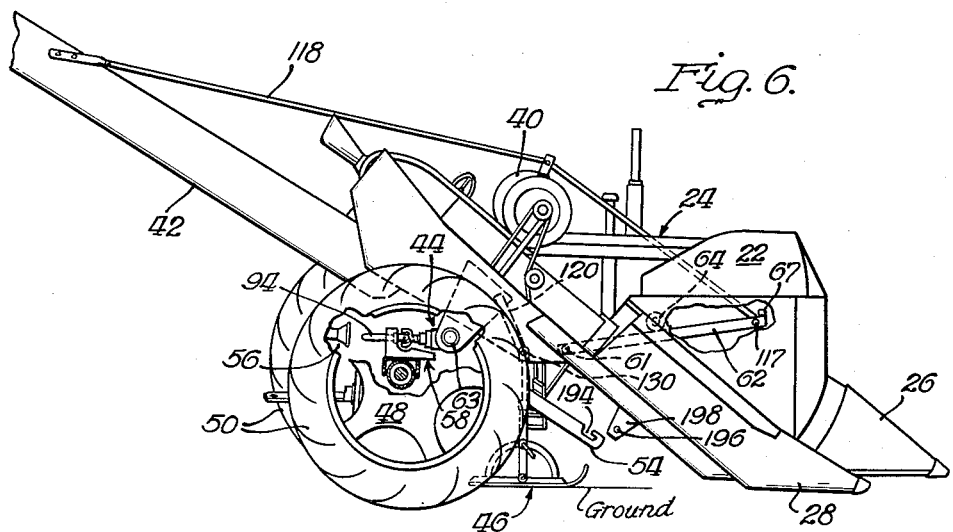
Fig. 6 is a side view of tractor-harvester combination, with the tractor approaching a position of supporting engagement with the harvester, wherein parts are broken away and in section in order to illustrate certain details.

More specifically, and with reference to the other figures of the drawings, the corn harvester 22 includes a generally U-shaped frame member 60 supporting the pairs of harvester rolls 32 and the dividers 26 and 28. Disposed within the forward housing formed by the center divider 26 is a pair of elongated, spaced-apart members 62 (Figs. 6–8) providing pivotal connections 117 at their forward ends with a pair of tie bars for a rearward section of the harvester comprising the wagon elevators 42 and which are pivotally mounted at their rearward ends on the frame 60, as by the bolts 61. In this latter respect it will be noted that the pivot bolts 61 are closely disposed with respect to the pivot pins 130 for the supporting jacks 46 which are essentially at the point of balance for the entire harvester structure. The forward end of each of the members 62 has pivotally connected thereto the forward end of a pair of transversely spaced members or tie rods 118 which extend rearwardly to the wagon elevators 42 for support thereof. A pair of suitable stop means 67 (Figs. 5 and 6) are provided on the harvester frame 60 in order to limit the relative movement of the forward end of the members 62 with respect to the frame. The forward ends of the elevators 42 each include a trunnion 115 (Fig. 3) which is pivotally mounted in a pair of rearwardly facing yoke members 116 carried at the rear portion of each side of the harvester. Thus there is provided a structural arrangement affording relative swinging movement of the elevators 42 with respect to the main portion of the corn harvester.

The members 62, which are preferably curved slightly downwardly toward their forward ends, are disposed for underlying engagement with a pair of spaced rollers 64 (Fig. 1) mounted on the forward portion of the tractor 24. Consequently, as the tractor moves within the harvester frame structure 60, the rollers 64 engage the upper edge of the members 62 to thereby position the rear ends of the wagon elevators 42 with respect to the tractor. Thus, it is seen that the rollers 64 will maintain the elevator tie bars 62 in position with respect to the tractor and, also, that this construction affords relative pivotal movement of the harvester frame structure 60, so that the elevators 42 will be maintained in a substantially fixed position irrespective of the up and down movement of the harvester frame structure 60.

The rearwardly disposed portion of the frame 60 also supports the harvester drive mechanism 44 (Fig. 3) at the rear of each of the harvesting roll assemblies 32, which include the pair of transversely aligned bearing structures 63 affording a pivotal mounting for a universal drive coupling 65.

Looking particularly at Fig. 15, it is seen that the drive coupling 65 comprises a housing 66 rotatably supporting a longitudinally extending stub shaft 72 carrying a gear 74 for constant meshing engagement with the gear 70. The transverse shaft 68 is mounted at opposite ends thereof in a pair of bearings 76 carried by the housing 66, and one end of the shaft projects through the housing to provide a support for an external drive sprocket 78. The sprocket 78 is suitably connected in driving relation with other sprockets (not shown) included in the drive mechanism 44 for transmitting power to the harvester rolls 30, fans 40, gathering chains 38, and the elevators 42. An oil seal 80 is disposed between the outer end of the cross shaft 68 and the housing 66 to retain lubricant in the latter.

The stub shaft 72 is suitably mounted in the housing 66 in rearwardly extending relation thereto, as by bearings 82, and an oil seal 84 is provided for the shaft at the end of the housing. The outer end of the shaft 72 presents a splined end portion 86 to which is secured an internally splined section 88 of a universal drive joint 90. An outer yoke portion 92 of the universal joint 90 has fixed thereto a drive shaft 94, as by means of a pin 96 extending through the yoke 92 and the shaft 94.

The laterally extending portions of the housing 66, which afford the mountings for the bearings 76, also provide means for supportingly engaging the downwardly extending side members 97 and 97a (Figs. 3 and 5) of the housing provided for the drive mechanism 44. The extending housing portion 98 (Fig. 15) adjacent the sprocket 78 is journalled in one of the bearings 63 (Fig. 3) carried by an opening 99 through one of the side members 97a, as seen generally in Fig. 5, and the other extending portion 100 (Fig. 15) has fixed thereto an elongated cylindrical bearing element 102 (Fig. 3) which extends through the bearing 63 in the other side member 97 of the drive housing. It is seen, therefore, that the drive coupling 65 is carried by the harvester for rotation about a transverse axis defined by the bearings 63.

In order to retain the universal drive coupling 65 in a predetermined position relative to the harvester frame 60, there is provided a collar 106 around the rearwardly extending end of the housing 66 which is yieldably held in position relative to the harvester frame by means of connecting link 108 and spring 110. The link 108 is suitably attached to an overlying portion of the harvester structure for support thereby. There is also provided a free support for the rearwardly extending yoke portion 92 in the form of a flexible plate member 112 which is bolted to the housing 66 and extends rearwardly therefrom to a position of support for the yoke and the drive shaft 94 which is fixed thereto. The upwardly bent free end portion of the plate 112 provides a rest for the yoke 92 but is not attached therto. The plate 112 is disposed relative to the yoke so that the engagement of the shaft 94 with the drive 56 or 56a on the tractor elevates the yoke away from the plate 112 to permit free rotation of the yoke and shaft 94. A screw 114 extends upwardly through the plate 112 in position for engagement with a rearward portion of the housing 66 to thereby provide for proper vertical adjustment of the bracket 112 to afford the aforementioned clearance when shaft 94 is coupled to the drive 56 or 56a on the tractor.

The rear portion of each side of the harvester frame 60 also carries the pair of rearwardly facing yoke members 116 (Fig. 3) which provide a pivot mounting for the forward end of the wagon elevator 42 associated with each pair of the harvesting rolls 32. The rearward ends of the elevators are supported by the pair of tie rods 118 (Fig. 1) which are preferably adjustable as to length and extend to a pivotal connection 117 at the forward end of the harvester frame.

The rear portion of the harvester frame 60 also carries the pair of extensible members in the form of the supporting jacks 46 for maintaining the harvester in a self-supported position, with the harvester inclined upwardly to the rear to permit ready engagement with the tractor 24 (Fig. 1). Each of the jacks 46 comprises a supporting strap member 120 (Fig. 3) fixed to the inner side member 97 of the main drive housing, and a leg 122 pivotally connected to the lower end of the strap 120. As seen best in Figs. 16–19, the leg 122 includes a tubular post 124 having a yoke member 126 adjustably secured to its upper end. The yoke includes a pair of aligned openings 128 for receiving a pin 130 which extends through the strap 120 to provide a pivotal connection between the strap and the yoke 126. The yoke is fixed to the upper end of a threaded rod 132 which extends into the post 124 for threaded engagement with a nut 134 fixed to the upper end of the post, to thereby adjust the position of the yoke 126 with respect to the post.

The bottom end portion of the post 124 is fixed to a cross brace member 138 which extends between the two jacks and is braced thereto by a pair of struts 139. Further support is provided for the jacks 46 by a longitudinally extending base support or stand 140 disposed at the bottom of each of the posts 124. The stand 140 comprises a bottom angle member 142 terminating at its forward end in an upwardly turned and rearwardly curved skid portion 144 (Fig. 1), a semi-circular member 146 having a plurality of openings 148 therethrough, and a locking means 150 for positioning the stand relative to the post 124. The locking means 150 is supported on the post 124 by a bracket 152 and includes an L-shaped rod 154, which has one portion thereof disposed through aligned openings in the bracket 152 and in a laterally extending tubular element 156. A spring 158 fixed at one end on the rod urges the latter toward the post 124, and the handle portion of the rod 154 is movable against a cam surface 160 at the outer end of the tubular element 156 to a selected one of a pair of positions thereon, which respectively position the rod away from the member 146 and the openings 148 therein and toward the post 124 and through one of the openings 148.

As indicated previously, the pivot pin 130 for the jacks 46 is essentially at the center of balance for the entire harvester frame structure. Actually, the center of balance is disposed slightly forwardly of the pins 130, in order to maintain the forward end of the harvester on the ground when in its jack-supported position.

The mounting means on the tractor for supportingly receiving the harvester 22 includes the lift arms 54 and the pivot mountings 58 referred to above. As seen particularly in Figs. 12 and 13, the power lift on the tractor comprises a rectangular frame structure 162, which is supported in depending relation to an intermediate section of the tractor by a pair of strap members 164, secured to the transmission housing 166 as by bolts 168, and a forward pair of vertical plates 170 secured to the rear portion of the engine housing 172. A cross member 174, at the rear of the frame 162, provides a mounting for one end of a hydraulic ram 176 which has one end of its cylinder portion pivotally connected to the member 174 by means including a bolt 178. The plunger rod 180 of the ram 176 extends forwardly to a pivotal connection 182 with the free end of an arm 184 fixed to a transverse rock shaft 186 which is rotatably mounted in a pair of bearing structures 188 fixed to the side members of the frame 162 as by bolts 190. The outer end portions of the rock shaft 186 have fixed thereto the pair of forwardly extending, parallel lift arms 54. In the illustrated embodiment, the hydraulic ram 176 is of the double-acting type and includes a pair of hoses 192 extending to a suitable source of hydraulic pressure (not shown) on the tractor for control by the operator.

The forward end portion of each of the lift arms 54 includes an L-shaped slot 194 affording a detachable connection with a pair of pins 196 (Figs. 6–8) carried by a pair of depending arms 198 fixed to an intermediate portion of the corn harvester 22. As will be described more fully in a following portion of the description, the slots 194 are disposed to prevent the displacement of the pins 196 from the slots during operation of the harvester, and yet free movement vertically between the bayonet connections provided by the pins 196 and slots 194 is afforded when the forward points 26 and 28 of the harvester are resting on the ground in an inoperative position.

The mounting means provided on the tractor for receiving the corn harvester pivots provided by the circular housing portions 98 and the elongated cylindrical elements 102 described above comprises the pair of pivot mountings 58 and 58a which are disposed on outer end portions of the tractor rear axle structure 48 in transversely spaced relation. As seen best in Figs 2, 10 and 11, each of the pivot mountings 58 and 58a comprise a channel 200 which is secured in supported relation on the rear axle housing by a pair of arcuate straps 202. The channel 200 has fixed thereto, as by welding, a pair of spaced-apart, vertical plate members 204 having aligned, curved bearing surfaces 206 which provide a saddle for receiving the pair of pivot bearings 102 on the harvester in a manner affording relative rotation therebetween. It is to be particularly noted that the axis of rotation afforded by the bearing surfaces 206 is disposed in closely overlying relation to the axis of rotation for the tractor rear axle structure 48.

Looking particularly at Fig. 10, it will also be seen that the bearing surfaces 206, provided by the plates 204, are formed with a flat, horizontal portion 208, of a relatively short length designated by the letter "$x$," disposed between a pair of cylindrical segments, as seen in Fig. 10. This particular feature of construction is advantageous in that it permits a rolling motion of the trunnion 63 with respect to the bearing surface 206 during vertical adjustment of the harvester relative to the tractor. And, since the pivot mounting is necessarily an engagement of two non-lubricated elements, the rolling motion described eliminates a considerable amount of friction which would normally be present if the surface 206 was cylindrical to conform with the trunnions 63. In effect, the described construction permits the axis of the trunnions 63 to shift longitudinally of the tractor, without detracting from the support provided by the bearing surfaces 206, during vertical swinging movement of the corn harvester. And, as will be seen later, the described arrangement is also a factor in maintaining a locking between the pins 196 and the slots 194 on the lift arms 54 when the harvester is raised to an operative position relative to the tractor.

Fixed to each pair of the plates 204, in rearwardly extending relation, are another pair of plates 210 and 212 which provide a mounting for the drive coupling 56. The drive coupling 56 shown in Fig. 11 is for the right side of the tractor and the similar coupling 56a for the left side is seen in Fig. 14. The two couplings are identical in construction but are mirror images of each other in order to place the drive transmitting means on each the same distance from the center line of the tractor. A detailed description will be given only for the right hand coupling seen in Fig. 11.

The rear portions of the plate members 210 and 212 are joined by a pair of longitudinally spaced, transverse plates 214 and 216 having aligned openings therethrough for supporting a pair of bearing structures 218 and 220. A tubular drive shaft 222 having a rectangular, or other non-circular, internal section 224 is rotatably mounted in the bearings 218 and 220. A guide funnel 226 is fixed to the forward plate 214, by means of the bolts 228 which also fix the bearing 218 in position, in coaxial relation to the hollow drive shaft 222 in order to facilitate engagement therewith by the rectangular shaft 94 on the harvester.

The hollow drive shaft 222 is driven by a sprocket 230, through a slip clutch 232 which affords disengagement of the driving connection between the sprocket 230 and the shaft 222 when a predetermined excessive load is placed on the latter. The sprocket 230 is driven through a chain 234 which extends around a drive sprocket 236 fixed to a center power take-off shaft 237 on the tractor. An adjustable idler sprocket 238, carried by a plate 240 fixed to the drive shaft mounting plate 216, provides for adjustment of the tension in the chain 234. Similar drive mechanism, with like parts bearing the reference suffix "$a$," is provided for the left hand drive coupling 56a.

Having in mind that above described structure, the manner of mounting the corn harvester 22 on the tractor 24 will be described, in order that certain of the advantages of the present invention may be more fully appreciated. As seen particularly in Fig. 1, the harvester 22, is adapted to stand by itself with the aid of the supporting jacks 46, with the harvester inclined upwardly toward the rear in position for mounting on the tractor. By means of the screw thread adjustment for the legs 122, which is controlled by the handle 136 (Fig.

17), these jacks may be individually adjusted to afford the proper elevation of the rear end of the harvester for coupling with the drive mechanism 56 and 56a and the saddles 58 and 58a on the tractor. The individual adjustment of the jacks 46 also affords a proper cross leveling of the harvester in the event that it rests on uneven ground. Furthermore, the position of the drive shafts 94 on the harvester drive mechanism 44 is also adjustable, by means of the set screws 114, to accurately position the shafts with respect to the guide funnel 226 on the tractor.

Figure 9:
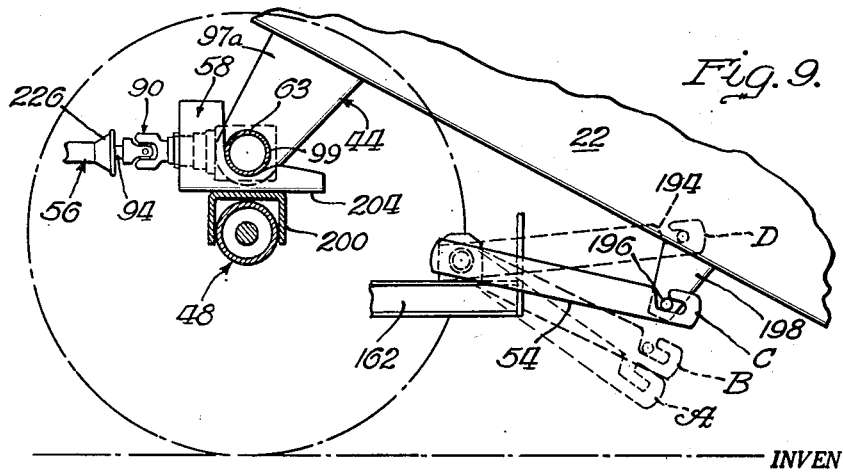
Fig. 9 is an enlarged, fragmentary view of the tractor-mounted corn-harvester, with parts in section.

The tractor 24 is driven within the harvester frame 60, with the dirigible front wheel structure 52 and the forward end of the tractor passing between the jacks 46. The laterally spaced tie bar members 62 are positioned for engagement by the rollers 64 (Fig. 6) at the front end of the tractor in underlying relation thereto. As the tractor moves forwardly (Fig. 7) the rollers 64 move along the bars 62 and may force them downwardly a bit to thereby elevate the rear end of the elevators 42. Also, the pins 196 move into a position overlying the slot 194 in the lift arms 54 (position A, Fig. 9), and the trunnions 63 which provide a transverse pivot element for the harvester overlie the tractor mounted support means comprising the saddles 206 on tractor rear axle. At this point the free end portion of the harvester drive shafts 94 partially engage the hollow drive shafts 222 to automatically establish driving relation therebetween. In this latter respect, in the event that the harvester drive shaft 94 does not properly mate with the tractor drive shaft 222, the application of power through the tractor power take-off and the slip clutch 232 will afford rotation of the shaft 222 until it properly engages the harvester drive shaft 94.

Figure 8:
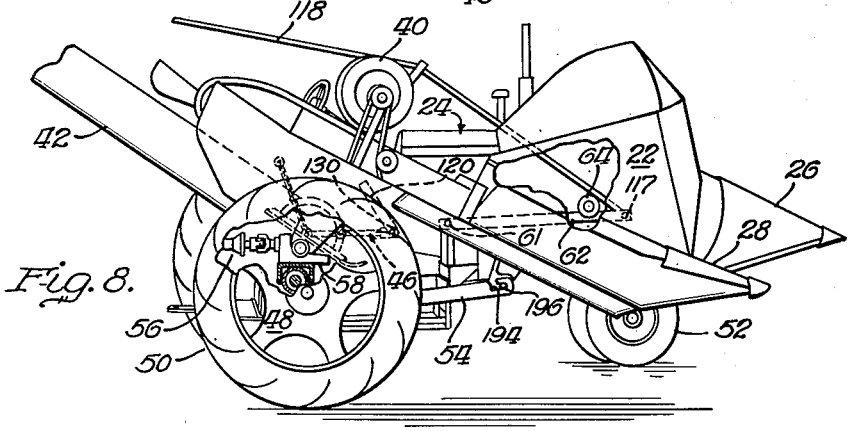
Fig. 8 is a view similar to Figs. 6 and 7, showing the harvester mounted on the tractor and elevated to an operating position.

The lift arms 54 are then raised to engage the pins 196 (position B, Fig. 9), and the continued upward movement of the lift arms (positions C and D, Fig. 9) swings the front end of the harvester 22 about the axis of the pivot pins 130 until the trunnions 63 are dropped into the saddles 206 (Fig. 8). This shifts the pivot support for the harvester from pins 130 to the saddles 206 and raises the jacks 46 free of the ground. Furthermore, the drive shafts 94 are moved into complete engagement with the hollow drive shafts 222. These jacks may therefore be collapsed by disengaging the locking lock 154 from the center opening 148 in the member 146 and moving it into engagement with the forward one of the openings 148a (Fig. 17) and by pivoting the leg portion 122 rearwardly about the pin 130. Suitable means, such as a chain, is used to secure the collapsed jacks in a rearwardly extending position beneath the tractor during operation of the harvester unit.

Figure 7:
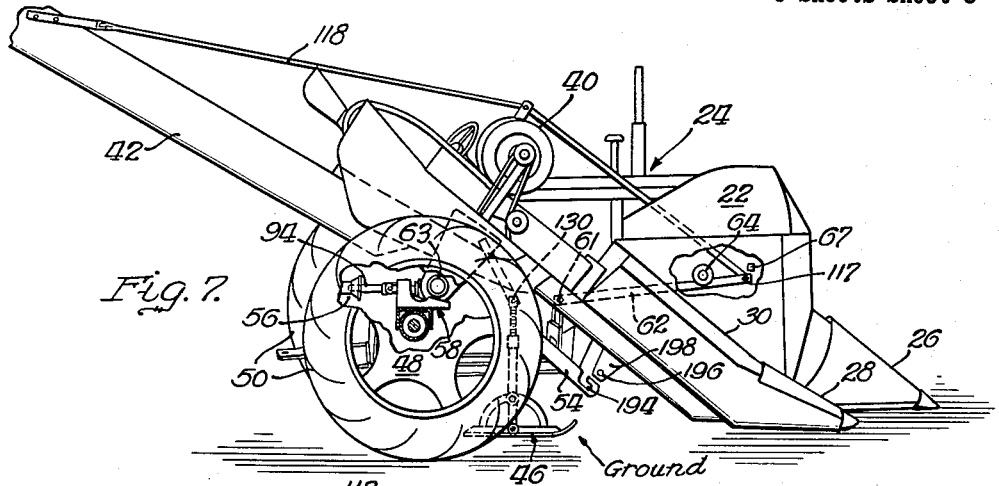
Fig. 7 is a view similar to Fig. 6, with the rollers at the front of the tractor having moved into engagement with the elevator tie bars.

The lift arms 54 are so positioned with respect to the tractor pivot mountings 206 that, with the harvester pivots 102 in position on the tractor mountings 206, the pins 196 can only be aligned with the vertical portion of the slots 194 affording a point of entry for the pins 196 when the forward end of the harvester rests on the ground (Fig. 7). Upward movement of the harvester about the axis of the pivot mounting 206, to an operating position free of the ground, effects a relative forward movement of the pins in the slots 194, thereby preventing relative displacement of the two. Consequently, it is impossible for the forward end of the harvester to become separated from the lift arms, for example through a shock force transmitted to the harvester upon the tractor striking a bump, when the harvester is elevated to an operating position with the center point 26 and the gathering points 28 clear of the ground.

It is also to be noted that the weight of the harvester unit 22 is balanced about the pivots 102, that is, the transverse pivot elements 102 are approximately at the center of balance for the harvester, so as to require a minimum lifting force to be exerted by the lift arms 54 in order to elevate the harvester and, also, to distribute the major portion of the harvester weight on the rear axle structure 48. This latter feature is particularly important in that it increases the tractive effort which can be exerted by the tractor 24 and minimizes the load imposed on the tractor front wheels 22 which otherwise tends to force the front wheels into the ground and detracts from the rolling support intended to be derived from these wheels.

In order to dismount the harvester from the tractor, the supporting jacks 46 are extended to a position of readiness for supporting the harvester, the lift arms 54 are lowered to place the front end of the harvester on the ground wherein the pins 196 will move rearwardly in the slots 194 to a position opposite the vertical opening in these slots to permit further downward movement of the lift arms 54. The lowering of the front end of the harvester 22 also effects the engagement of the supporting jacks 46 with the ground and thereby shifts the weight of the rear end of the harvester from the saddles 206 to the pivot pins 130 on the jacks. This shift, which is accomplished in the reverse manner on the mounting of the corn harvester, causes the trunnions 63 to swing upwardly out of the saddles 206 to a position clear of the tractor permitting withdrawal of the latter without further uncoupling.

It is seen, therefore, that the particular relationship of the trunnions 63 and the pivot pins 130 with respect to the center of balance of the corn harvester 22 affords a ready shifting of the point of pivotal support for the harvester, which makes possible the easy mounting and dismounting of the harvester just described. The lift arms 54 need only be moved through a relatively short arc to provide the added moment necessary to shift the weight of the harvester between the pivots 130 and 206 as required.

It is to be noted that the curved forward end portion of the supporting jacks 46 prevents interference from trash and the like, and also keeps the lower end of the jacks from digging into the ground when they are lowered into the supporting position. Furthermore, the jacks 46 are connected with the harvester 22 in close relation to the balance point, provided by the harvester pivots 102 as mentioned above, in order that the harvester may be readily raised and lowered, as for servicing. A support rod 244 is preferably pivotally mounted along an intermediate portion of each of the elevators 42 in order to provide, with the jacks 46, a four point support for the harvester when needed. This construction permits ready access to the harvesting rolls and other underlying portions of the harvester without requiring any mechanical lift device. One man can easily rotate the entire harvester structure to and from its tractor-receiving position, by virtue of the positioning of the jacks 46 in close relation to the center of balance for the structure.

It is seen from the foregoing, therefore, that apparatus constructed in accordance with the principles of the present invention provides structure affording easy and quick coupling of the harvester on the tractor, provides a balance of the harvester weight about the tractor rear axle, provides for a close drive coupling between the tractor and harvester, and affords a self-supporting harvester unit which is adjustably positionable relative to the ground to thereby receive the tractor in coupled relation therewith with a minimum of maneuvering. And, although described with respect to a two-row corn harvester, it will be apparent that the principles of this invention are equally applicable to a one-row harvester, and that certain of the features may be readily utilized in other apparatus without departing from the principles of this invention.

I claim:

1. An elongated harvester adapted to be mounted on a tractor having a power take-off, a transverse mounting shaft adjacent the center of balance of said harvester having bearing portions supporting said harvester adjacent the axle of said tractor, drive means on said shaft having means connected to the power take-off of the tractor, a slotted arm and pin connection between said tractor and a portion of said harvester spaced from said shaft, whereby said harvester may be adjusted about its center of balance without affecting said drive means.

2. The invention set forth in claim 1, including a ground engaging support means pivotally connected to said harvester adjacent the center of balance thereof, whereby there is provided means for balancing the harvester about its support means when mounted on the tractor and when removed therefrom and disposed in a position of rest on the ground.

3. The invention set forth in claim 1, wherein said harvester comprises a U-shaped frame structure adapted to receive the front end of a tractor and which extends along opposite sides of the tractor, with said transverse mounting shaft on each side of said frame structure having bearing portions supporting said harvester adjacent the axle of said tractor.

4. The invention set forth in claim 1, wherein said slotted arm and pin connection provides a bayonet connection wherein said pin is removable from the slot only when said lift arm is in its lowermost position of support for said implement.

5. The invention set forth in claim 1, wherein said transverse mounting shaft is adapted to engage a saddle member carried by the rear axle structure on the tractor, said saddle member comprising an upwardly facing, open bearing surface including a pair of circular segments which are joined by a relatively short, flat surface portion, to thereby provide for rotation as well as limited rolling movement of the mounting shaft in said saddle member.

6. The invention set forth in claim 1, wherein said transverse mounting shaft engages a saddle member carried by the rear axle structure on the tractor, and said drive means on said mounting shaft comprises a rearwardly extending harvester drive shaft which is telescopically engaged in driven relation with a hollow drive shaft driven from a source of power on the tractor, said hollow drive shaft being disposed on the tractor rearwardly of said saddle member.

7. The invention set forth in claim 1, wherein said harvester comprises a U-shaped frame structure adapted to receive the front end of the tractor and including a gathering unit supported by said frame structure along each of the opposite sides of the tractor, said transverse mounting shaft associated with each of said gathering units, and said drive means for the harvester comprises a harvester drive shaft extending rearwardly from each of said transverse mounting shafts in position for telescoping engagement with a hollow drive shaft on the tractor which is driven from the tractor power take-off, support means on said harvester for positioning each of said harvester drive shafts for said telescopic engagement with the associated hollow drive shaft, and a pair of saddle members carried by the rear axle structure of the tractor in adjacent, overlying relation thereto, said saddle members being disposed, respectively, adjacent and forward of said hollow drive shafts.

References Cited in the file of this patent
UNITED STATES PATENTS

| | | |
|---|---|---|
| Re. 21,542 | Oehler et al. | Aug. 27, 1940 |
| Re. 22,279 | Hyman et al. | Mar. 2, 1943 |
| Re. 22,991 | Hitchcock et al. | Mar. 23, 1948 |
| Re. 23,083 | Andrews et al. | Feb. 8, 1949 |
| 2,259,893 | Hyman | Oct. 21, 1941 |
| 2,264,565 | Coultas et al. | Dec. 2, 1941 |
| 2,320,135 | Hyman | May 25, 1943 |
| 2,508,345 | Hardy et al. | May 16, 1950 |
| 2,524,083 | Ronning | Oct. 3, 1950 |
| 2,554,198 | Kuhlman | May 22, 1951 |
| 2,662,459 | Shore | Dec. 15, 1953 |
| 2,700,262 | Andrews | Jan. 25, 1955 |